Oct. 29, 1957    J. W. EBBS ET AL    2,811,692
APPARATUS FOR TESTING ROTARY ELECTRIC DEVICES
Filed Oct. 22, 1954    6 Sheets-Sheet 1

INVENTOR.
John W. Ebbs
BY Harold C. Powers
Thomas C. Betts
ATTORNEY

Oct. 29, 1957 J. W. EBBS ET AL 2,811,692
APPARATUS FOR TESTING ROTARY ELECTRIC DEVICES
Filed Oct. 22, 1954 6 Sheets-Sheet 2

INVENTOR
John W. Ebbs and
Harold L. Powers
BY
Thomas L. Bitts
ATTORNEY

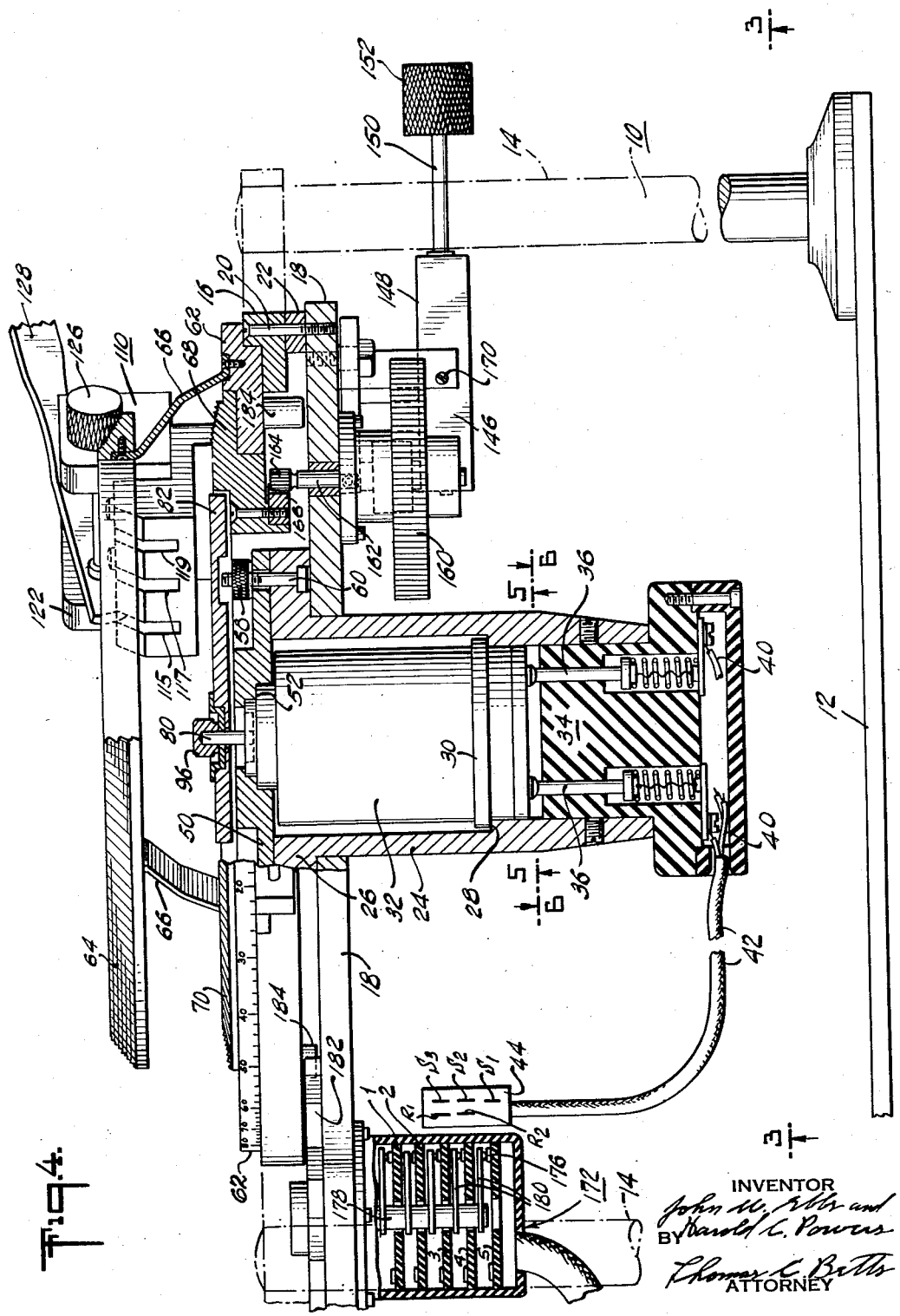

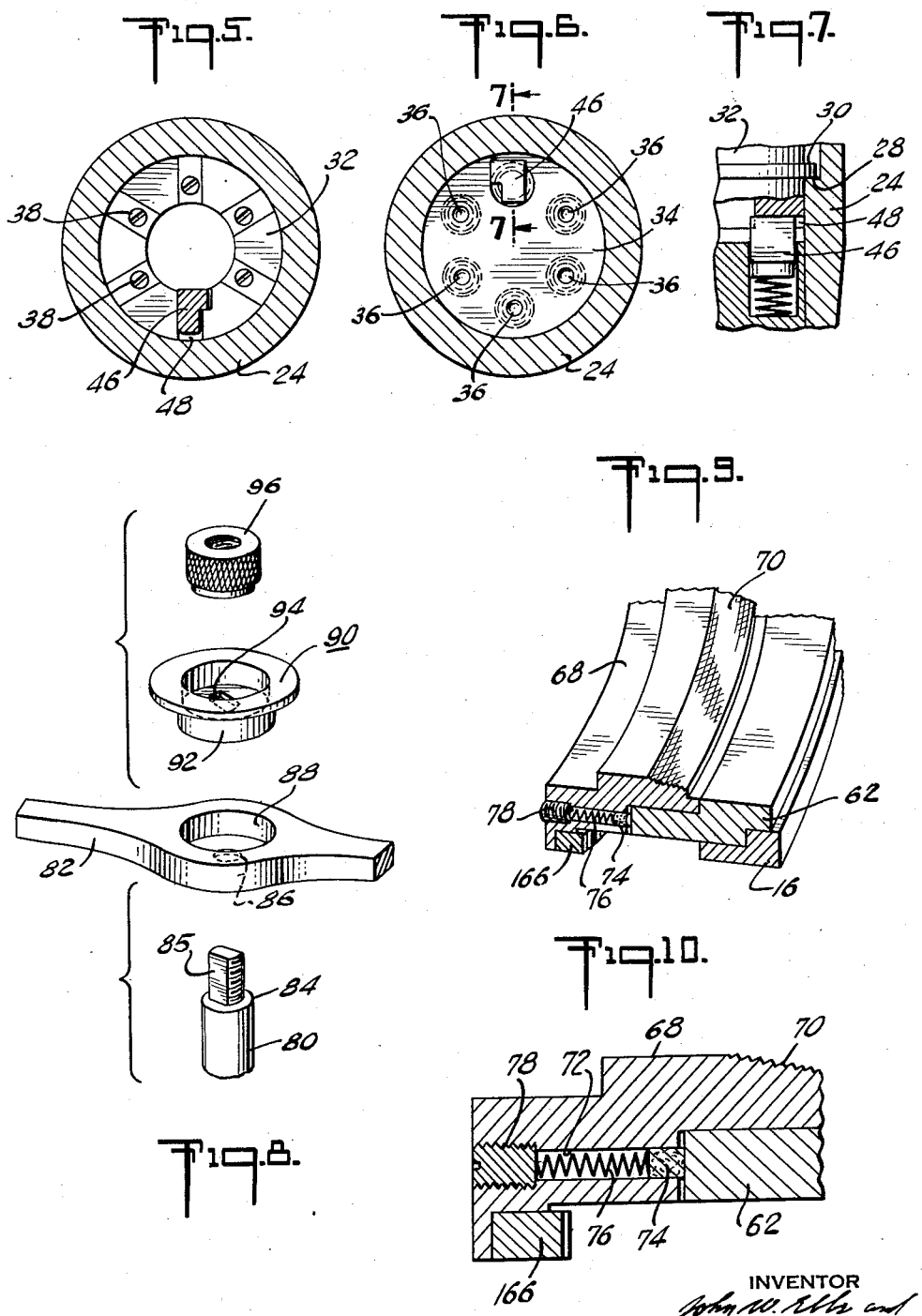

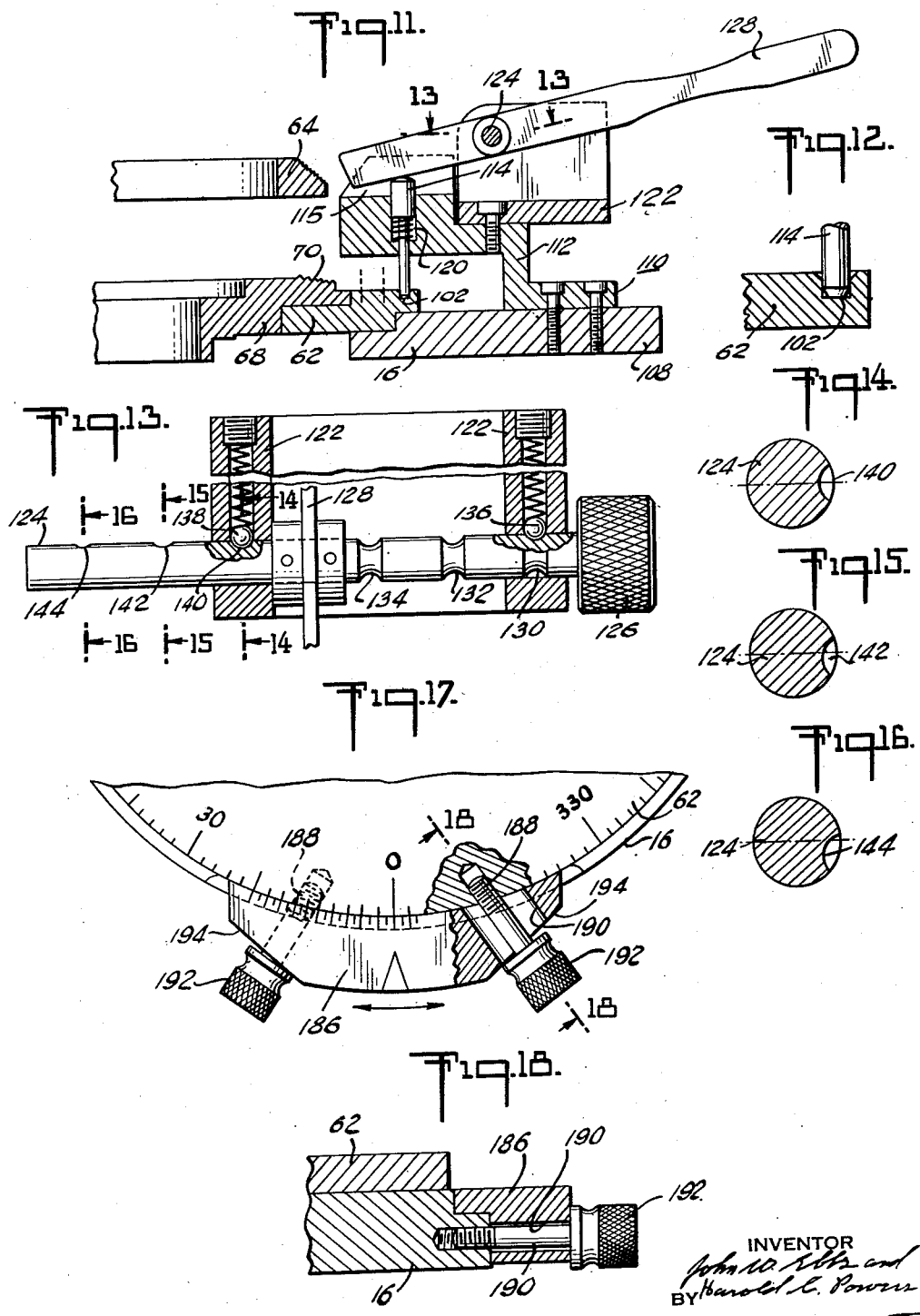

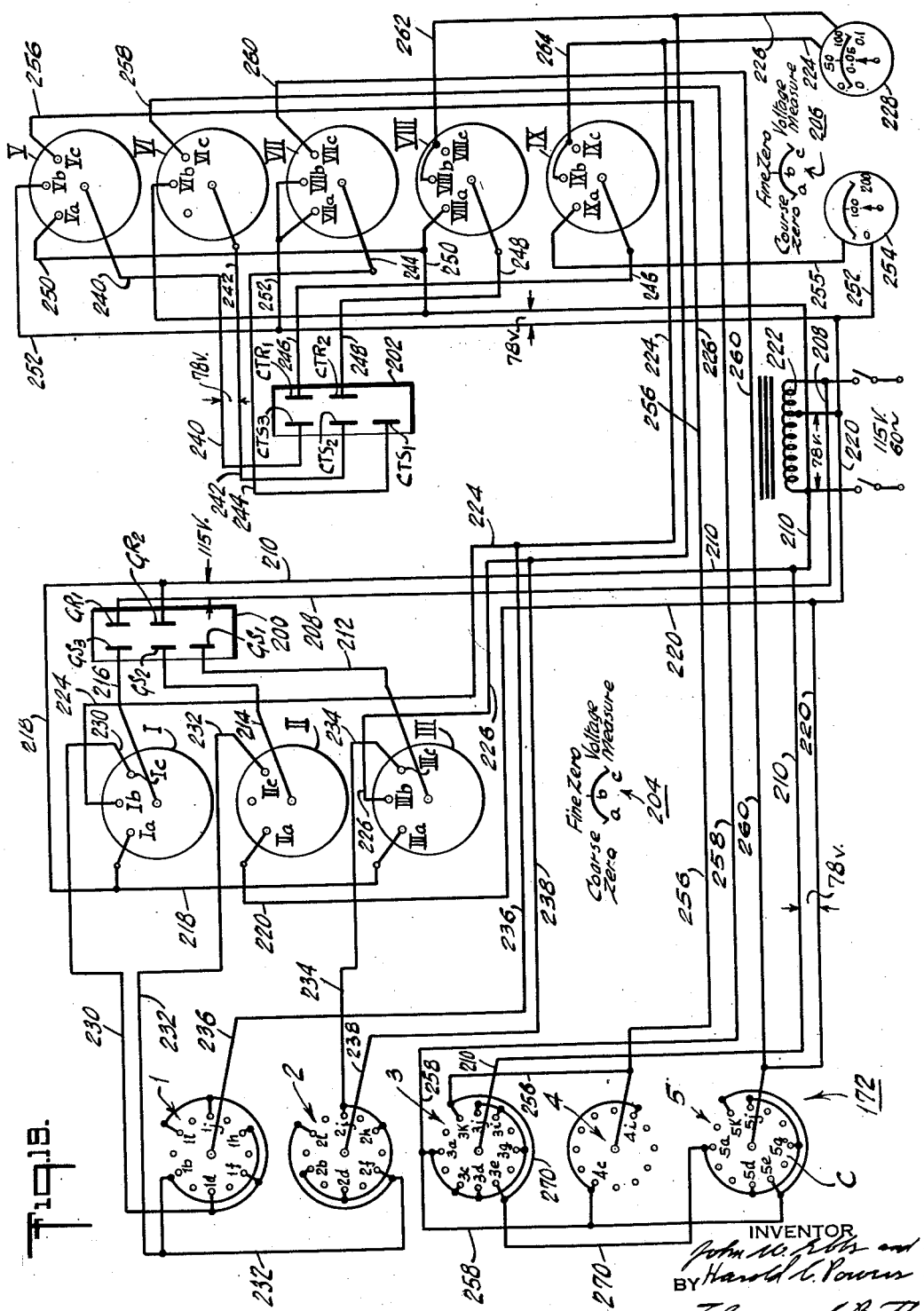

United States Patent Office 2,811,692
Patented Oct. 29, 1957

2,811,692

APPARATUS FOR TESTING ROTARY ELECTRIC DEVICES

John W. Ebbs, Greenwich, and Harold C. Powers, Cos Cob, Conn.; said Ebbs assignor to said Powers Application October 22, 1954, Serial No. 464,094

16 Claims. (Cl. 324—158)

Our invention relates to apparatus for testing rotary electric devices, more particularly synchros.

A synchro is a rotary inductor which produces voltages by transformer action bearing a definite relationship to the angle through which its rotor shaft has been turned from a reference point, or conversely, the shaft of which will turn through a definite angle dependent on the value of the impressed voltage. The hereinafter described device is designed to test all synchro types, including synchro transmitters, receivers, control transformers and differentials. The purpose of a synchro system is to convey mechanical information in the form of angular displacement and velocity to other locations by electrical means, and combinations of the above synchro types are used to accomplish this.

In order to carry out the desired tests, it is first necessary to determine the electrical zero of the synchro, which involves applying a voltage to certain windings and then slowly turning the rotor until a minimum voltage reading is obtained on a meter connected to other windings. Then it is necessary to turn the rotor to selected angular positions at which voltage readings are take either across different windings at different angles in the case of a transmitter or receiver, or across the same winding while applying a voltage across different windings at different angles in the case of a control transformer.

Accordingly, our invention includes a fixture into which a synchro to be tested may be quickly inserted and clamped in position, electrical connections at the same time being automatically established with the terminals of the synchro. The fixture has a rotatable ring having a zero angle reference to which the rotor may be connected for rotation therewith after the electrical zero of the rotor has been established. This ring has one or more series of locating means whereby it, and the rotor connected thereto, may be rapidly turned to and stopped at different selected angular positions. Geared to the ring so as to be rotated therewith is a rotary switch so constructed and electrically connected that for each angular position of the ring and rotor, the proper electrical connections to give the desired voltage readings are automatically established. Thus it is possible with our invention to test a synchro in a small fraction of the time heretofore required and with greater accuracy, as there is no possibility of incorrect angular positioning or the establishing of wrong electrical connections.

Further objects and advantages of our invention will be apparent from the following description when considered in connection with the accompanying drawings, which form a part of this specification and in which:

Fig. 4 is a cross-sectional view taken approximately on lines 4—4 of Figs. 2 and 3;

Fig. 5 is a cross-sectional view taken on the line 5—5 of Fig. 4;

Fig. 6 is a cross-sectional view taken on the line 6—6 of Fig. 4;

Fig. 7 is a detailed cross-sectional view taken on the line 7—7 of Fig. 6;

Fig. 8 is an exploded view of the end of a synchro shaft and a portion of the parts for connecting the shaft to a rotatable ring;

Fig. 9 is a perspective cross-sectional view of a friction brake between two parts of the rotatable ring;

Fig. 10 is an enlarged cross-sectional view of the brake shown in Fig. 9;

Fig. 11 is an enlarged cross-sectional view taken on the line 11—11 of Fig. 2;

Fig. 12 is a cross-sectional view of a detail of Fig. 11 on a still larger scale;

Fig. 13 is a cross-sectional view taken on the line 13—13 of Fig. 11;

Fig. 14 is a cross-sectional view on an enlarged scale taken on the line 14—14 of Fig. 13;

Fig. 15 is a cross-sectional view on an enlarged scale taken on the line 15—15 of Fig. 13;

Fig. 16 is a cross-sectional view on an enlarged scale taken on the line 16—16 of Fig. 13;

Fig. 17 is a top view on an enlarged scale of a vernier shown in Fig. 2;

Fig. 18 is a cross-sectional view taken on the line 18—18 of Fig. 17; and

Fig. 19 is a wiring diagram of an electric circuit in conjunction with which the fixture is adapted to be used.

Figure 1:
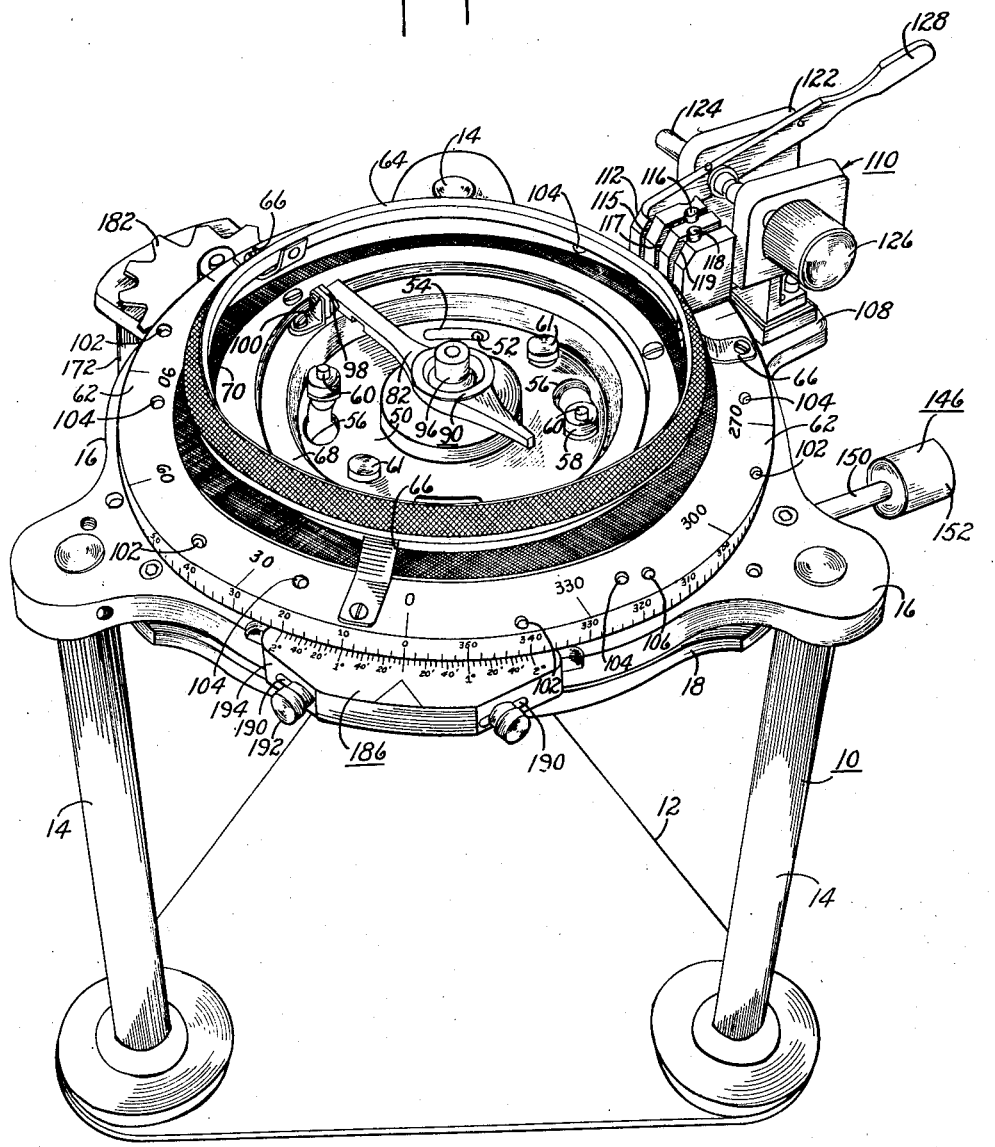
Fig. 1 is a perspective view of a synchro testing fixture in accordance with our invention with a synchro in position therein.

Referring to the drawings, and more particularly to Figs. 1 through 4, reference character 10 designates generally a stand or framework including a triangular base 12, three uprights or legs 14 secured to the base, and a stationary ring 16 supported at the upper ends of the legs. Also forming part of the stationary stand is a plate 18 which is carried below ring 16 by screws 20 and is spaced from the ring by washers 22. This plate is formed with a central aperture in which is fixed a cylindrical member 24 formed with an outwardly extending flange 26 which overlaps and rests on the upper surface of the plate. Member 24 is formed with an internal upwardly facing shoulder 28 on which is adapted to seat a flange 30 formed on the cylindrical housing of the synchro 32 which is to be tested.

The lower end of member 24 is closed by an insulating member 34 which carries a number of spring loaded axially displaceable contact pins 36. A standard synchro has five electric terminals 38, located as is shown in Fig. 5, at one end thereof, and the contact pins 36, as illustrated in Fig. 6, are equal in number and location so as to automatically establish connections between the terminals 38 and five wires 40 in a cable 42 which leads to a five pronged connector plug 44. A synchro has a single phase winding and a three phase winding, and the prongs $R_1$ and $R_2$ of plug 44 are connected to the single phase winding, while the prongs $S_1$, $S_2$ and $S_3$ are connected to the three phase winding.

In addition to the contact pins, the insulating member 34 also carries a spring loaded asymmetrically shaped locating pin 46 which is received in a similarly shaped recess 48 formed in the end of the synchro. The interaction of this locating pin and recess assures that each pin 36 will contact the proper terminal 38.

The synchro 32 is retained in member 24 by means of a cover plate 50 which bears against an end surface 52 of the synchro. This cover plate is accurately located with respect to member 24 by means of a pair of diametrically spaced pins 52 (Figs. 1 and 2) which extend upwardly from flange 26 and are received in arcuate slots 54. The cover 50 is also formed with a pair of bayonet type slots 56, each having an enlarged end through which may pass knurled nut 58 threaded on the end of a stud 60 extending up from flange 26. If, after the cover plate is placed in position by having the nuts 58 pass through the enlarged ends, the cover is rotated clockwise, as viewed in Figs. 1 and 2, the nuts may be tightened down so as to engage the edges of the narrow portion of each slot, to thereby quickly secure the cover in place. A pair of knurled knobs 61 may be secured to cover plate 50 to serve as handles when putting it in place and removing it.

Rotatably mounted in fixed ring 16 is an outer rotatable ring 62 which is manually turnable by means of a hand ring 64 secured thereto by brackets 66. Rotatably mounted in ring 62 in an inner rotatable ring 68 provided with a knurled upper surface 70 by means of which it may be turned by hand. Normally the rings 62 and 68 will turn together by virtue of a friction brake arrangement shown in Figs. 9 and 10. The inner ring 68 is formed with a radial bore 72 in which is received a leather brake member 74 which is urged into frictional engagement with the inner surface of ring 62 by a spring 76 retained in place by a threaded plug 78. Preferably there are three such brakes spaced 120° apart around the ring 68. As above stated, this braking means normally causes the two rings to rotate as one, but if the outer ring 62 is locked, as will be described hereinafter, the braking means will slip so as to permit turning of inner ring 68 relative to the outer ring.

In order to connect the shaft 80 of the synchro 32 with the inner rotatable ring 68, a removable arm 82 is provided. As is shown in Fig. 4, when the synchro is within cylindrical member 24 and the cover plate 50 is in place, the end of shaft 80 extends out through a hole in the cover plate. This end of the shaft is formed with a shoulder 84, beyond which extends a threaded portion 85 of reduced diameter and formed with flats, as is illustrated in Fig. 8. Arm 82 is provided with a circular aperture 86 through which the reduced portion 85 extends so that the lower surface of the arm bears against the shoulder 84. The upper side of the arm is formed with a circular recess 88 which is concentric with aperture 86. A dish shaped member 90 has a cylindrical portion 92 which fits within recess 88 and in the bottom of the cylindrical portion there is an aperture 94 having the same configuration as has the end portion 85 of the shaft. A knurled nut 96 is intended for threaded engagement with end portion 85.

If the parts shown in Fig. 8 are assembled in the manner illustrated in Fig. 4, that is with member 90 within recess 88, the end portion 85 of the shaft extending through apertures 86 and 94, and nut 96 screwed onto the end portion but not tightened down, the shaft 80 and the arm 82 may be rotated relative to each other, as the member 90, which must turn with the shaft, is loose to turn in recess 88. However, when the desired angular positioning of the shaft with respect to the arm has been obtained, as will be explained hereinafter, the arm may be fixed to the shaft by turning the nut 96 down tight against the bottom of member 90, thus clamping this member tightly against the bottom of recess 88 of arm 82.

The longer end of arm 82 overlies inner rotatable ring 68 and has a permanent magnet 98 secured thereto. An angle bracket 100 of magnetic material is secured to the upper surface of ring 68 on the same radius as magnet 98. Bracket 100 has a face lying in a plane in which is also disposed the center line of synchro shaft 80. The arrangement is such that, with the parts in the position shown in Figs. 1 and 2, rotation of the ring 68 in a counter-clockwise direction, which is its usual direction of motion, will cause the arm 82 to follow it because of the magnetic coupling between magnet 98 and the aforementioned face of bracket 100. Of course, rotation of the ring 68 clockwise will cause the bracket to push the arm ahead of it, but in either case the magnetic coupling permits radial movement between the magnet and the bracket in the event that the synchro shaft 80 is not absolutely concentric with ring 68. If such movement were not possible, it could result in bending of, and hence damage to, the shaft.

The upper surface of outer rotatable ring 62 is formed with a plurality of series or groups of locating holes, each series cooperating with a different locating pin. The number of series, and the number and spacing of the holes in each series, depends on the type or types of synchros to be tested. The particular arrangement herein disclosed is suitable for testing typical synchro transmitters, receivers, and control transformers, but it is to be understood that this is by way of example only.

Figure 2:
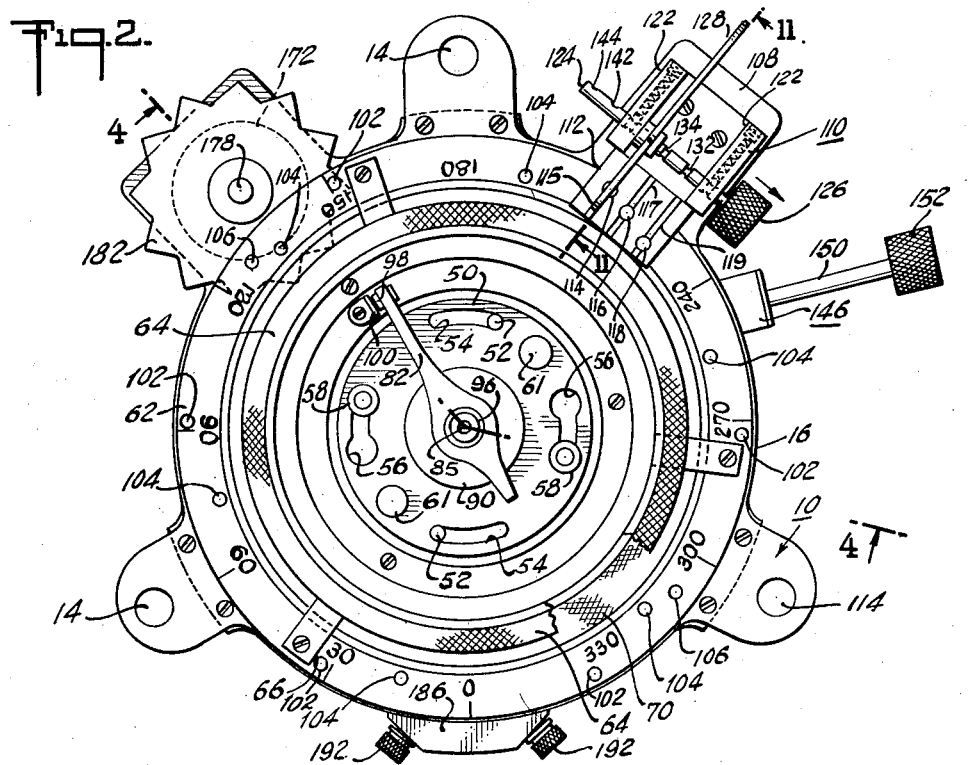
Fig. 2 is a top view of the apparatus shown in Fig. 1.

As is best seen in Fig. 2, ring 62 has three series or groups of locating holes, each series being on a different radius. In the outermost series there are six holes 102 spaced very accurately 60° apart circumferentially. In the innermost series there are also six holes 104 spaced accurately 60° apart, but these holes 104 are located circumferentially between the holes 102. In the middle series there are but two holes 106, spaced 180° apart.

Mounted on an extension 108 of fixed ring 16 is a locating pin assembly designated generally by reference character 110. This assembly includes a frame 112 extending over outer rotatable ring 62, as shown in Fig. 11, and in which are reciprocably mounted three locating pins 114, 116 and 118, the center lines of these pins being on the same radii as the series of holes 102, 106 and 104, respectively. The upper ends of pins 114, 116 and 118 are disposed in parallel slots 115, 117 and 119, respectively, formed in frame 112. Each pin is biased upwardly by means of a spring 120 so that its lower end is above ring 62. The upper ends of the locating holes and the lower ends of the pins are chamfered, as is shown in Fig. 12 in order that the pins may enter the holes readily, but the diameters of the holes and pins are held within close tolerances so as to substantially eliminate play.

Secured to the frame 112 is a U-shaped member 122 journaled in the upstanding legs of which is a shaft 124 having a knurled knob 126 on one overhung end thereof. This shaft is both rotatable and axially displaceable with respect to the member 122 and a lever 128 is fixed to the shaft between the legs of the member. As is seen in Fig. 13, shaft 124 is formed with three circumferential grooves 130, 132 and 134 which are axially spaced apart the same distances as are slots 116, 117 and 119. Disposed in one leg of member 122 is a spring pressed detent 136 which is adapted to engage the different grooves as the shaft 124 is displaced axially by pulling or pushing on the knob 126, and to releasably retain the shaft in the desired axial position. As shown in Figs. 1, 2, 4, 11 and 13, when detent 136 engages groove 130, lever 128 is aligned with slot 115 and if the right-hand end of the lever is lifted, the other end will enter slot 115 and depress locating pin 114 until its lower end contacts ring 62. If the ring is then turned until one of the locating holes 102 comes into alignment with pin 114, the lever will push the pin into the hole, thus locking ring 62 against rotation.

Biasing spring 120 on whichever one of the locating pins is depressed tends to lift the pin but this is resisted by a spring loaded detent 138 in the other leg of member 122 which engages one of three recesses 140, 142 or 144 in shaft 124. These recesses are spaced axially the same distance as are the grooves 130, 132 and 134, and are also spaced angularly about the shaft a slight amount, as will be seen from a comparison of Figs. 14, 15 and 16 with each other, in order to compensate for the slightly different distances lever 128 has to be pivoted in order to depress the pins 114, 116 and 118, respectively, because of the different distances these pins are located from shaft 124.

Figure 3:
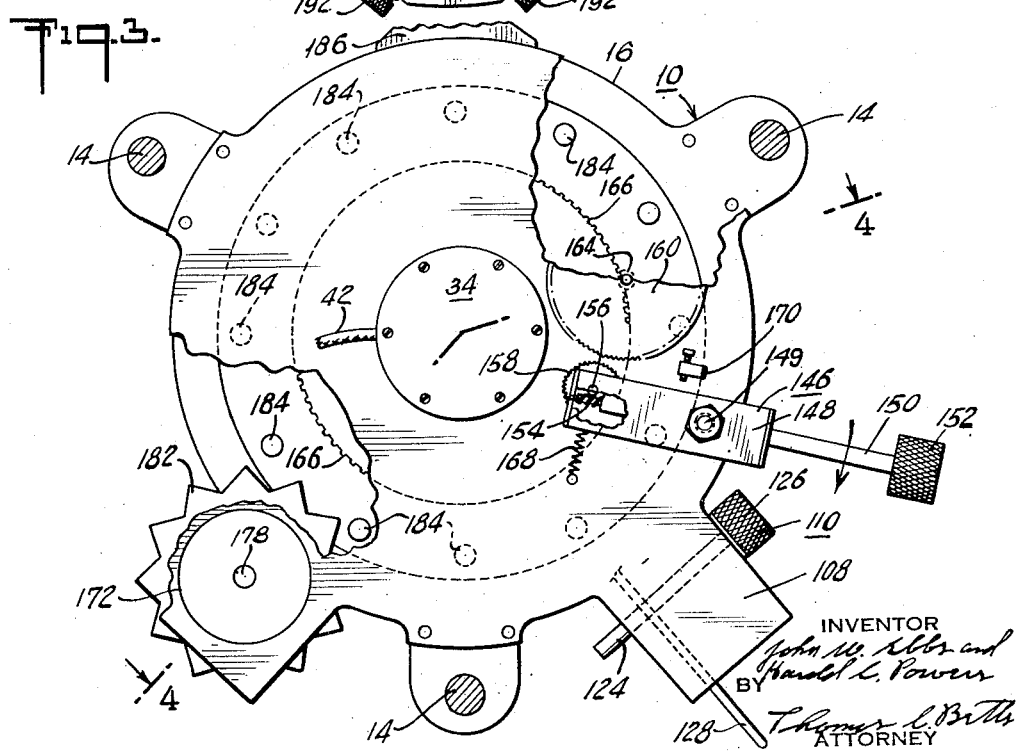
Fig. 3 is a bottom view taken on the line 3—3 of Fig. 4 with certain parts broken away.

As above stated, the inner rotatable ring 68 has a knurled surface 70 in order that the ring may be turned by hand, thus making possible a quick but rough angular adjustment. There is also provided a reduction gear drive, designated generally by reference character 146. As seen in Fig. 3, this includes a member 148 pivotally mounted on a stud 149 below the fixed ring 16. A horizontal shaft 150 having a knurled knob 152 at its outer end is journaled in member 148 and its inner end carries a worm 154 which meshes with a worm gear 156 on a vertical shaft journaled in member 148. The upper end of the latter shaft carries a rubber roller 158 which normally is slightly spaced from the knurled edge of a disc 160 which is fixed to a shaft 162 journaled in fixed plate 18, as best shown in Fig. 4. On the upper end of shaft 162 is a pinion 164 which meshes with a ring gear 166 fixed to inner rotatable ring 68. A tension spring 168 is connected between member 148 and plate 18 and biases roller 158 away from disc 160. However, when it is desired to turn ring 68 by means of the reduction gear drive 146, knob 152 is grasped and shaft 150 is pivoted as a lever in the direction of the arrow in Fig. 3 so as to bring roller 158 into frictional engagement with disc 160, whereupon rotation of shaft 150 by the knob will cause ring 68 to turn very slowly. A ratio of 900 to 1 between shaft 150 and ring 68 is desirable in order to obtain the necessary fine angular adjustment of the ring. An adjustable stop 170 may be provided in order to prevent excessive pressure between roller 158 and disc 160.

Mounted below plate 18 more or less opposite to gear drive 146 is a rotary switch 172 of the multiple deck type. As seen in Fig. 4, the switch includes five fixed spaced discs or decks 1, 2, 3, 4 and 5, each of which carries a circular row of contacts 176. Extending through central openings in the decks in a shaft 178 which carries a rotary contact 180 above each of the decks for cooperation with the respective rows of fixed contacts 176. The upper end of shaft 178 carries a star wheel 182 having twelve teeth. Extending downwardly from outer rotatable ring 62 is a series of twelve pins 184 equidistantly spaced and hence 30° apart. These pins are so located, as is shown in Fig. 3, that they will engage the teeth on star wheel 182 as the ring 62 is turned and hence will turn the star wheel and the shaft 178. There being twelve pins and twelve teeth, a complete revolution of the ring will rotate the star wheel one complete turn, each pin turning the wheel one twelfth of a revolution, or 30°. As will be seen from the wiring diagram of Fig. 19, the circular row 176 on each deck consists of twelve contacts and they are so arranged with respect to the rotary contacts 180 that as each pin 184 passes by the star wheel the latter is positioned so that each rotary contact is in contact with a fixed contact.

Outer rotatable ring 62 is calibrated in angular degrees and adjustably secured to fixed ring 16 is a vernier plate 186 cooperating with the calibrations on the ring, as is best seen in Figs. 1, 17 and 18. A pair of studs 188 are threaded in ring 16 and extend through slots 190 in plate 186 and are provided with knurled heads 192 at their outer ends. Plate 186 is formed with flat surfaces 194 which are not quite parallel to the under surfaces of heads 192. Consequently, if for example, the left stud 188 in Fig. 17 is screwed into ring 16 a little, while the right stud is screwed out, vernier plate 186 will be moved very gradually to the right. The purpose of this vernier is to make it possible to check the device for incorrect angular settings which would result from wear of the locating holes and pins.

While the particular electric circuits required to test synchros are not part of our invention, nevertheless suitable circuitry is shown in Fig. 19, as it is felt that this is necessary for a complete understanding of the operation of the above described device which does constitute our invention.

As previously explained, the rotary switch 172 includes five stationary discs or decks 1, 2, 3, 4 and 5, each of which carries a circular row of twelve contacts, the individual contacts being designated $1_a$ through $1_l$, $2_a$ through $2_l$, $3_a$ through $3_l$, $4_a$ through $4_l$, and $5_a$ through $5_l$, respectively. Certain of these contacts, while physically present in the switch, are not connected or used electrically, and in Fig. 19 reference characters have been applied only to those contacts which are connected.

The circuit also includes two receptacles 200 and 202, each of which is adapted to receive the plug 44 shown in Fig. 4, the plug being inserted in receptacle 200 when a synchro transmitter or receiver is being tested and in receptacle 202 when a control transformer is undergoing test. Receptacle 200 has contacts $GR_1$, $GR_2$, $GS_1$, $GS_2$ and $GS_3$, which are arranged to receive the prongs $R_1$, $R_2$, $S_1$, $S_2$ and $S_3$, respectively, of plug 44 when the plug is placed in this receptacle, while the corresponding contacts of receptacle 202 are designated $CTR_1$, $CTR_2$, $CTS_1$, $CTS_2$ and $CTS_3$, respectively.

Also included in the circuit is a three deck rotary switch 204 and a five deck rotary switch 206. The decks of switch 204 are designated I, II and III, and each deck has three fixed contacts $I_a$, $I_b$ and $I_c$; $II_a$, $II_b$, and $II_c$; and $III_a$ $III_b$ and $III_c$, respectively. The decks of switch 206 are designated V, VI, VII, VIII and IX, and each deck has three contacts $V_a$, $V_b$, and $V_c$; $VI_a$, $VI_b$ and $VI_c$; $VII_a$, $VII_b$, and $VII_c$; $VIII_a$, $VIII_b$, and $VIII_c$; and $IX_a$, $IX_b$, and $IX_c$, respectively. Each switch has a movable contact for each deck, all the movable contacts of each switch being turned together by means of a knob. The three positions a, b and c of each knob are labeled "Coarse Zero," "Fine Zero," and "Voltage Meas.," respectively.

Contacts $GR_1$ and $GR_2$ of receptacle 200 are connected by conductors 208 and 210 with a source of 115 volt, 60 cycle current, so that whenever plug 44 is inserted in receptacle 200, the single phase winding of the synchro transmitter is energized by this current. The contacts $GS_1$, $GS_2$ and $GS_3$ are connected by conductors 212, 214 and 216 with the movable contacts associated with decks III, II and I, respectively of switch 204. Contacts $I_a$ and $III_a$ of switch 204 are connected together and to conductor 210 by means of a conductor 218, while contact $II_a$ is connected by a conductor 220 with a 78 volt tap on an auto transformer 222. Contacts $I_b$ and $III_b$ are connected by conductors 224 and 226 to a voltmeter 228 having a high range of 0 to 100 volts and a low range of 0 to 0.10 volt.

Contacts $I_c$ of switch 204 is connected by conductor 230 with contacts $1_d$, $1_f$, $1_j$ and $1_l$ of switch 172. Contact $II_c$ is connected by conductor 232 with contacts $1_b$, $1_h$, $2_f$ and $2_l$, while contact $III_c$ is connected by conductor 234 with contacts $2_b$, $2_d$, $2_h$ and $2_j$. The rotary contacts associated with decks 1 and 2 of switch 172 are connected by conductors 236 and 238 to conductors 224 and 226, respectively, which lead to the voltmeter 228.

When it is desired to test synchro transmitter or receiver, it is placed in the cylindrical member 24 and the cover 50 is secured in place to clamp the synchro in position. Outer rotatable ring 62 is turned by hand until it is in zero angular position, as indicated by the scales thereon and on the vernier plate 186. The ring is then locked in this position by moving lever 128 to depress pin 114 into engagement with one of the locating holes 102 in the outer series, inasmuch as this series has a locating hole at zero position. Arm 82, member 90 and nut 96 are then placed on the shaft of the synchro, but the nut is left loose. Arm 82 is turned until magnet 98 contacts bracket 100. Plug 44 is then placed in receptacle 200 and consequently the single phase winding of the synchro is supplied with current at 115 volts through conductors 208 and 210, contacts $GR_1$ and $GR_2$ and prongs $R_1$ and $R_2$. Switch 204 is turned to "Coarse Zero" position, in which connections are established between the movable contact arms and fixed contacts Ia, IIa and IIIa. Thus, one terminal of the three phase winding in the synchro is connected through prong $S_2$, contact $GS_2$, wire 214, movable contact of deck II, fixed contact IIa and wire 220 with the 78 volt tap on transformer 222, while the other two terminals of the three phase winding are connected together and to conductor 210 through prongs $S_1$ and $S_3$, contacts $GS_1$ and $GS_3$, conductors 212 and 216, movable contacts of decks III and I, fixed contacts IIIa and Ia, and conductor 218. Consequently, 78 volt, single phase current is applied across one terminal of the three phase winding and the two other terminals connected together which, together with the 115 volts across the single phase winding, causes the shaft of the synchro to turn to close to its zero position.

Nut 96 is now tightened so as to clamp arm 82 to the synchro shaft, and switch 204 is turned to the "Fine Zero," position, where the movable contacts of decks I and III establish circuits through fixed contacts Ib and IIIb, respectively, the corresponding fixed contact on deck II being a dummy. This connects two of the terminals of the three phase winding with voltmeter 228 through prongs $S_1$ and $S_3$, contacts $GS_1$ and $GS_3$, wires 212 and 216, rotatable contacts of decks III and I, fixed contacts IIIb and Ib, and conductors 226 and 224. The primary winding is still energized by 115 volts. The gear reduction drive 146 is then engaged by pivoting member 148 and shaft 150 to bring roller 158 into engagement with disc 160, whereupon shaft 150 is rotated by knob 152 so as to very slowly rotate inner ring 68, which through arm 82 turns the shaft of the synchro. Inasmuch as outer rotatable ring 62 is locked by locating pin 114, it remains stationary, the brake 74 slipping to permit ring 68 to turn. As the synchro shaft is turned slowly in this manner the reading of voltmeter 228 will change, and the shaft is turned back and forth until a minimum voltage reading is obtained, indicating that the synchro shaft is at its electrical zero position whereupon the gear reduction drive 146 is disengaged.

Switch 204 is now turned to "Voltage Meas." position in which the rotary contacts establish circuits through fixed contacts Ic, IIc, and IIIc. Lever 128 is pivoted to release locating pin 114 and shaft 124 is pulled axially by knob 126 to line up lever 128 with pin 118. Hand ring 64 is used to turn outer ring 62 counter-clockwise as viewed in Fig. 2 through an angle of 30° and locating pin 118 is moved into engagement with a hole 104 to accurately locate and lock the ring at 30°. Friction brake 74 has caused inner ring 68 to turn through 30° and arm 82 has turned the synchro shaft a like amount. The turning of ring 62 has caused one of the pins 184 carried thereby to engage a tooth of star wheel 182 so as to turn the latter one step, thus causing the rotary contact arms associated with decks 1 and 2 of switch 172 to complete circuits through fixed contacts 1b and 2b. Inasmuch as these rotary contacts are connected through wires 236 and 238 with wires 224 and 226 leading to voltmeter 228, and contact 1b is connected through wire 232, fixed contact IIc, movable contact of deck II, wire 214 and contact $GS_2$ with prong $S_2$ of plug 44, while contact 2b is connected through wire 234, fixed contact IIIc, movable contact of deck III, wire 212 and contact $GS_1$ with prong $S_1$, the voltmeter will indicate the voltage across the two terminals of the three phase winding which are connected to prongs $S_1$ and $S_2$ with the synchro shaft 30° from electrical zero, which is a value required in accordance with the test procedure. It is to be remembered that the single phase winding is still energized with 115 volts, as previously described.

Locating pin 118 is now released by lever 128, the rings 62 and 68 and the synchro shaft turned through 60° by means of hand ring 64 and coated and locked by engaging pin 118 in the next hole 104. This causes two pins 184 to engage teeth on the star wheel, and hence the movable contacts of switch 172 are moved two steps, so as to engage fixed contacts 1d and 2d. The voltmeter 228 is still connected to the movable contacts of decks 1 and 2 and fixed contact 2d, being connected to contact 26, is connected to prong $S_1$ through the same circuit as above described. However, contact 1d is connected to prong $S_3$, through wire 230, fixed contact Ic of switch 204, movable contact of deck I, wire 216 and contact $GS_3$. Hence, voltmeter 228 will give the voltage across the two terminals of the three phase winding which are connected to prongs $S_1$ and $S_3$ with the shaft 90° from electrical zero, which is another required reading.

In a similar manner the rotatable rings 62 and 68 and the synchro shaft are positioned at 150°, 210°, 270° and 330°, the rotary switch 172 automatically establishing the proper circuits so that the voltmeter 228 gives reading across the proper synchro terminals at the respective angles.

It will be noted that the testing of a synchro transmitter or receiver involves the use of receptacle 200, switch 204 and decks 1 and 2 of switch 172. The testing of a synchro control transformer, on the other hand, involves receptacle 202, switch 206 and decks 3, 4 and 5 of switch 172. Contacts $CTS_3$, $CTS_2$ and $CTS_1$ of receptacle 202 are connected by conductors 240, 242 and 244 with the rotary contacts of decks V, VI and VII, respectively of switch 206, while conductors 246 and 248 connect contacts $CTR_1$ and $CTR_2$ with rotary contacts of decks VIII and IX, respectively. Fixed contacts Va and VIIIa are connected by wire 250 with one side of the auto transformer 222. The 78 volt tap of this transformer is connected by a wire 252 with fixed contacts Vb, VIIa and VIIb of switch 206, and with one terminal of a voltmeter 254 having a range of 0 to 200 volts. The other terminal of this meter is connected by wire 255 with fixed contact IXa.

Fixed contact Vc is connected through wire 256 with the rotary contact of deck 4 of switch 172. Fixed contact VIc is connected by conductor 258 with fixed contacts 3a, 3c, 3d, 3g, 3i, 3j, 4c, 4i, 5c and 5k of switch 172. Fixed contact VIIc is connected by wire 260 with the rotary contact of deck 5 of switch 172 and to conductor 220 leading from the 78 volt tap on the auto transformer 222. Fixed contacts VIIIb and VIIIc are connected together and through wires 262 and 226 to one side of voltmeter 228, while contacts IXb and IXc are connected together and through wires 264 and 224 to the other side of the voltmeter 228.

In order to test a synchro control transformer, it is placed in member 24, the cover 50 put on, the plug 44 inserted in receptacle 202 and switch 206 turned to "Coarse Zero" position. This applies 78 volts across the terminals of the three phase winding in the synchro which are connected to prongs $S_1$ and $S_3$, the circuit being from the transformer 222 through wire 252, contact VIIa, a rotary switch arm of deck VII, wire 244, contact $CTS_1$ and prong $S_1$ to one terminal, and from the other terminal through prong $S_3$, contact $CTS_3$, wire 240, rotary contact of deck V, fixed contact Va and wire 250 back to the transformer. One wire 250 of the 78 volt line is connected through contact VIIIa, rotary contact of deck VIII, wire 248, contact $CTR_2$ and prong $R_2$ with one terminal of the single phase winding of the synchro, while the other terminal of this winding is connected through prong $R_1$, contact $CTR_1$, wire 246, rotary contact of deck IX, fixed contact IXa and wire 255 with one side of voltmeter 254, the other side of the meter being connected through wire 252 with the 78 volt tap.

The synchro shaft is now turned by hand until a minimum reading is obtained on meter 254, which indicates the approximate electrical zero of the synchro. Ring 62 having been locked in zero position by locating pin 114 engaging one of holes 102, arm 82 is now placed on the synchro shaft with its end magnetically coupled to bracket 100, in which position nut 96 is tightened to lock the arm to the shaft.

Switch 206 is now turned to "Fine Zero" position. This connects one wire 252 of the 78 volt line with two terminals of the three phase winding in the synchro through fixed contacts $V_b$ and $VII_b$, the movable contacts of decks V and VII, conductors 240 and 244, contacts $CTS_3$ and $CTS_1$, and prongs $S_3$ and $S_1$. The other wire 250 of the 78 volt line is connected to the third terminal of the three phase winding through fixed contact $VI_b$, movable contact of deck VI, conductor 242, contact $CTS_2$ and prong $S_2$. At the same time the voltmeter 228 is connected across the terminals of the single phase winding through prongs $R_1$ and $R_2$, contacts $CTR_1$ and $CTR_2$, wires 246 and 248, movable contacts of decks VIII and IX, wires 262 and 264, and wire 226 and 224. The fine drive 146 is now engaged, as previously described, and inner ring 68, arm 82 and the synchro shaft are slowly turned back and forth until a minimum reading is obtained on meter 228, which indicates the electrical zero of the synchro.

Switch 206 is now turned to "Voltage Meas." position. The voltmeter 228 remains connected to the single phase windings, as contact $VIII_b$ is connected to contact $VIII_c$, while contact $IX_b$ is connected to contact $IX_c$. Arm 128 is moved to release locating pin 114 and the arm is moved sideways into alignment with slot 117 and the rotatable rings 62 and 68 are turned together 90°, whereupon lever 128 is pivoted to engage pin 116 in a hole 106 to accurately locate and lock the rings at the 90° position. This turning of the rings causes three of the pins 184 to engage teeth of the star wheel 182 so as to move the rotary contacts of switch 172 three steps to automatically establish the following circuits.

The two terminals of the three phase winding which are connected to prongs $S_1$ and $S_3$ are connected to one side of the 78 volt line through contacts $CTS_1$ and $CTS_3$, wires 244 and 240, rotary contacts of decks VII and V, fixed contacts $VII_c$ and $V_c$, wires 260 and 256, rotary contact of deck 5, fixed contact $5_d$, and a wire 270 which is connected to the last-mentioned wire 256, the 78 volt tap of the auto transformer being connected to wire 260 through wire 220. The other wire 210 of the 78 volt circuit is connected to the third terminal of the winding through rotary contact of deck 3, fixed contact $3_d$, wire 258, fixed contact $VI_c$ of switch 206, rotary contact of deck VI, wire 242, contact $CTS_2$ and prong $S_2$. The voltage indicated by meter 228 is then recorded.

Locating pin 116 is then released and the rings 62 and 68 are turned 180° to the 270° position, where they are accurately located and locked by engaging pin 116 with the other hole 106. This turning of the rings has moved the star wheel 182 and rotary contacts of switch 172 six steps. However, this establishes exactly the same circuits as last described at the 90° position, inasmuch as contact $3_d$ is connected to contact $3_j$, and contact $5_d$ is connected to contact $5_j$. The voltage reading of meter 228 is recorded, the voltages at 90° and 270° being the ones required by this part of the test.

The final portion of the test involves obtaining minimum voltage readings at approximately 60°, starting at 0°. To accomplish this the rings 62 and 68 are turned to 0° and pin 118 is engaged in one of the holes 104. This again establishes the same connections as were set up at the 90° and 270° positions, inasmuch as contact $3_a$ is connected to contact $3_d$ and contact $5_a$ is connected to contact $5_d$. However, instead of recording the voltage indicated by meter 228, the fine drive 146 is engaged and the position of the synchro shaft is slowly shifted until a minimum voltage reading is obtained, which reading is recorded.

Locating pin 118 is then withdrawn and the rings 62 and 68 turned to the 60° position, where they are locked by engaging pin 118 in the next hole 104. This turns the rotary contacts of switch 172 two steps which establishes circuits connecting together and to one side of the 78 volt line the two terminals of the three phase winding which are connected to prongs $S_2$ and $S_3$, while connecting the other terminal to the other side of the 78 volt line. From prongs $S_2$ and $S_3$ the connection is through contacts $CTS_2$ and $CTS_3$, wires 242 and 240, rotary contacts of decks VI and V, fixed contacts $VI_c$ and $V_c$, wires 258 and 256, and fixed contact $4_c$ and rotary contact of deck 4 of switch 172. Wire 210 of the 78 volt line is connected through movable contact of deck 3 and fixed contact $3_c$ to wire 258. The other wire 220 of the 78 volt circuit is connected through wire 260, fixed contact $VII_c$, movable contact of deck VII, wire 244, and contact $CTS_1$ to prong $S_1$ and the other terminal of the three phase winding. The fine drive 146 is then engaged and the synchro shaft moved gradually until a minimum voltage reading is obtained on meter 228.

The above procedure is repeated at the 120°, 180°, 240° and 300° positions of the synchro shaft, the rotary switch establishing the proper circuits for each position of the shaft, but particularly as these specific circuits do not form part of our invention, it is not believed to be necessary to trace them through.

From the foregoing it is apparent that the device in accordance with our invention is capable of enabling an operator to rapidly and accurately conduct the necessary testing of a synchro, including establishing the electrical zero, and determining secondary voltages and minimum voltages at various angular positions of the synchro shaft. Although the device to be tested is referred to throughout the specification and claims as a synchro, this term is to be interpreted as including any rotary electric device. While we have shown and described a more or less specific embodiment of our invention, it is to be understood that this has been done for the purpose of illustration only, and that the scope of our invention is not to be limited thereby, but is to be determined from the appended claims.

What we claim is:

1. In a device of the class described, a stationary frame, means for mounting a synchro in said frame, a member rotatably mounted in said frame, means for connecting the shaft of said synchro to said member for rotation therewith, means for positioning said member at predetermined fixed angular positions of rotation, and switching means actuated by rotation of said member for establishing desired electrical connections at each of said fixed angular positions of said member.

2. In a device of the class described, a stationary frame, ring means rotatably mounted on said frame, means for mounting a synchro in said frame with its shaft concentric with said ring means, means for connecting said shaft to said ring means for rotation therewith, means for positioning said ring means at predetermined fixed angular positions of rotation, and switching means actuated by rotation of said ring means for establishing predetermined electrical connections at each of said fixed angular positions of said ring means.

3. In a device of the class described, a stationary frame, ring means rotatably mounted on said frame, means for mounting a synchro in said frame with its shaft concentric with said ring means, an arm detachably connected to said shaft, a magnetic coupling between said arm and said ring means to cause said arm and shaft to rotate with said ring means, means for positioning said ring means at predetermined fixed angular positions of rotation, and switching means actuated by rotation of said ring means for establishing predetermined electrical connections at each of said fixed angular positions of said ring means.

4. In a device of the class described, a stationary frame, ring means rotatably mounted on said frame, means for mounting a synchro in said frame with its shaft concentric with said ring means, an arm detachably connected to said shaft, a bracket on said ring means having a surface in a plane in which is disposed the center line of said shaft, a magnetic coupling between said arm and said surface to cause said arm and shaft to rotate with said ring means, means for positioning said ring means at predetermined fixed angular positions of rotation, and switching means actuated by rotation of said ring means for establishing desired electrical circuits at each of said fixed angular positions of said ring means.

5. In a device of the class described, a stationary frame, ring means rotatably mounted on said frame, means for mounting a synchro in said frame with its shaft concentric with said ring means, means for connecting said shaft to said ring means for rotation therewith, said ring means being formed with a plurality of locating holes spaced circumferentially therearound at different angular positions, a locating pin insertable into said holes for locating and securing said ring means at different fixed angular positions of rotation, and switching means actuated by rotation of said ring means for establishing predetermined electrical connections at each of said fixed angular positions of said ring means.

6. In a device of the class described, a stationary frame, ring means rotatably mounted on said frame, means for mounting a synchro in said frame with its shaft concentric with said ring means, means for connecting said shaft to said ring means for rotation therewith, said ring means being formed with a plurality of groups of locating holes disposed therearound on respective circles of different diameters, a plurality of locating pins carried by said frame in alignment with the respective circles, means for selecting any one of said pins for insertion into a hole of the group with which the selected pin is aligned for locating and securing said ring at different fixed angular positions of rotation, and switching means actuated by rotation of said ring means for establishing predetermined electrical connections at each of said fixed angular positions of said ring means.

7. In a device of the class described, a stationary frame, a first ring rotatably mounted on said frame, a second ring concentric with and rotatably mounted in said first ring, means for mounting a synchro in said frame with its shaft concentric with said rings, means for connecting said shaft with said second ring for rotation therewith, means for causing said rings to rotate together, means for positioning said first ring at predetermined fixed angular positions of rotation, switching means actuated by rotation of said first ring for establishing desired electrical circuits at each of said fixed angular positions of said first ring, and means for turning said second ring relative to said first ring.

8. In a device of the class described, a stationary frame, a first ring rotatably mounted on said frame, a second ring concentric with and rotatably mounted in said first ring, means for mounting a synchro in said frame with its shaft concentric with said rings, means for connecting said shaft with said second ring for rotation therewith, means for positioning said first ring at predetermined fixed angular positions of rotation, friction means between said rings for causing rotation of said first ring to turn said second ring, switching means actuated by rotation of said first ring for establishing desired electrical circuits at each of said fixed angular positions of said first ring, and means for turning said second ring relative to said first ring against the resistance of said friction means.

9. In a device of the class described, a stationary frame, a first ring rotatably mounted on said frame, a second ring concentric with and rotatably mounted in said first ring, means for mounting a synchro in said frame with its shaft concentric with said rings, means for connecting said shaft with said second ring for rotation therewith, means for causing said rings to rotate together, means for positioning said first ring at predetermined fixed angular positions of rotation, switching means actuated by rotation of said first ring for establishing desired electrical circuits at each of said fixed angular positions of said first ring, and a gear reduction drive for turning said second ring relative to said first ring.

10. In a device of the class described, a stationary frame, a first ring rotatably mounted on said frame, a second ring concentric with and rotatably mounted in said first ring, means for mounting a synchro in said frame with its shaft concentric with said rings, means for connecting said shaft with said second ring for rotation therewith, means for causing said rings to rotate together, means for positioning said first ring at predetermined fixed angular positions of rotation, switching means actuated by rotation of said first ring for establishing desired electrical circuits at each of said fixed angular positions of said first ring, a gear reduction drive for turning said second ring relative to said first ring, and means for disengaging said drive.

11. In a device of the class described, a stationary frame, a first ring rotatably mounted on said frame, a second ring concentric with and rotatably mounted in said first ring, means for mounting a synchro in said frame with its shaft concentric with said rings, means for connecting said shaft with said second ring for rotation therewith, means for positioning said first ring at predetermined fixed angular positions of rotation, friction means between said rings for causing rotation of said first ring to turn said second ring, switching means actuated by rotation of said first ring for establishing desired electrical circuits at each of said fixed angular positions of said first ring, and a gear reduction drive for turning said second ring relative to said first ring against the resistance of said friction means.

12. In a device of the class described, a stationary frame, a first ring rotatably mounted on said frame, a second ring concentric with and rotatably mounted in said first ring, means for mounting a synchro in said frame with its shaft concentric with said rings, means for connecting said shaft with said second ring for rotation therewith, means for causing said rings to rotate together, said first ring being formed with a plurality of locating holes spaced circumferentially therearound at different angular positions, a locating pin insertable into said holes for locating and securing said first ring at different fixed angular positions of rotation, switching means actuated by rotation of said first ring for establishing desired electrical circuits at each of said fixed angular positions of said first ring, and means for turning said second ring relative to said first ring when the latter is secured by said locating pin.

13. In a device of the class described, a stationary frame, a first ring rotatably mounted on said frame, a second ring concentric with and rotatably mounted in said first ring, means for mounting a synchro in said frame with its shaft concentric with said rings, means for connecting said shaft with said second ring for rotation therewith, said first ring being formed with a plurality of locating holes spaced circumferentially therearound at different angular positions, a locating pin insertable into said holes for locating and securing said first ring at different fixed angular positions of rotation, friction means between said rings for causing rotation of said first ring to turn said second ring, switching means actuated by rotation of said first ring for establishing predetermined electrical circuits at each of said fixed angular positions of said first ring, and means for turning said second ring relative to said first ring against the resistance of said friction means when the first ring is secured by said locating pin.

14. In a device of the class described a stationary frame, a first ring rotatably mounted on said frame, a second ring concentric with and rotatably mounted in said first ring, means for mounting a synchro in said frame with its shaft concentric with said rings, means for connecting said shaft with said second ring for rotation therewith, means for causing said rings to rotate together, said first ring being formed with a plurality of locating holes spaced circumferentially therearound at different angular positions, a locating pin insertable into said holes for locating and securing said first ring at different fixed angular positions of rotation, switching means actuated by rotation of said first ring for establishing desired electrical circuits at each of said fixed angular positions of said first ring, and a gear reduction drive for turning said second ring relative to said first ring while the latter is secured by said locating pin.

15. In a device of the class described, a stationary frame, a first ring rotatably mounted on said frame, a second ring concentric with and rotatably mounted in said first ring, means for mounting a synchro in said frame with its shaft concentric with said rings, means for connecting said shaft with said second ring for rotation therewith, said first ring being formed with a plurality of locating holes spaced circumferentially therearound at different angular positions, a locating pin insertable into said holes for locating and securing said first ring at different fixed angular positions of rotation, friction means between said rings for causing rotation of said first ring to turn said second ring, switching means actuated by rotation of said first ring for establishing predetermined electrical circuits at each of said fixed angular positions of said first ring, and a gear reduction drive for turning said second ring relative to said first ring against the resistance of said friction means when the first ring is secured by said locating pin.

16. In a device of the class described, a stationary frame, a cylindrical member carried by said frame for receiving a synchro, contact means in said member for establishing electrical connections with said synchro, a removable cover on said member for clamping said synchro against said contact means, a member rotatably mounted on said frame, means for connecting the shaft of said synchro to said member for rotation therewith, means for positioning said member at predetermined fixed angular positions of rotation, and switching means for establishing desired electrical circuits at each of said fixed angular positions of said member.

References Cited in the file of this patent
UNITED STATES PATENTS
2,402,749    Haskins _____ June 25, 1946